US010602444B2

(12) United States Patent
Simileysky et al.

(10) Patent No.: US 10,602,444 B2
(45) Date of Patent: Mar. 24, 2020

(54) REDUCING POWER CONSUMPTION IN COMPUTING DEVICES WITH WIRELESS NETWORK INTERFACES

(71) Applicant: Cypress Semiconductor Corporation, San Jose, CA (US)

(72) Inventors: Victor Simileysky, San Jose, CA (US); Kamesh Medapalli, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/941,542

(22) Filed: Mar. 30, 2018

(65) Prior Publication Data
US 2019/0200291 A1 Jun. 27, 2019

Related U.S. Application Data

(60) Provisional application No. 62/609,546, filed on Dec. 22, 2017.

(51) Int. Cl.
*H04W 52/02* (2009.01)
*H04W 84/12* (2009.01)

(52) U.S. Cl.
CPC ........ *H04W 52/0216* (2013.01); *H04W 84/12* (2013.01)

(58) Field of Classification Search
CPC ................................................ H04W 52/0216
See application file for complete search history.

(56) References Cited

U.S. PATENT DOCUMENTS

| 7,245,946 | B2 | 7/2007 | Liu |
| 7,412,265 | B2 | 8/2008 | Chen et al. |
| 7,457,973 | B2 | 11/2008 | Liu |
| 7,535,884 | B2 | 5/2009 | Stephenson et al. |
| 7,672,263 | B2 | 3/2010 | Sinivaara |
| 8,014,818 | B2 * | 9/2011 | Grandhi .............. H04W 74/002 455/552.1 |
| 8,117,299 | B2 | 2/2012 | Narayanaswami et al. |
| 8,693,380 | B2 | 4/2014 | He et al. |
| 8,799,692 | B2 * | 8/2014 | Fischer ................. G06F 1/3209 713/320 |
| 8,965,278 | B2 * | 2/2015 | Takayama ............ H04B 5/0031 455/41.1 |

(Continued)

OTHER PUBLICATIONS

Amber Wireless, Low Power WiFi Module 802.11 b/g/n, 2 pages.
(Continued)

*Primary Examiner* — Parth Patel

(57) ABSTRACT

An apparatus includes a wireless transceiver configured to communicate data with a network device. The apparatus also includes a processing device, operatively coupled with the wireless transceiver. The processing device is configured to determine whether a computing device coupled to the apparatus has data to transmit to the network device. The processing device is also configured to transmit a first message indicating that the computing device does not have data to transmit to the other device in response to determining that the computing device does not have data to transmit to the network device. The processing device is further configured to transition the apparatus to a reduced power state. The apparatus uses less power in the reduced power state than in an active state.

20 Claims, 7 Drawing Sheets

(56) References Cited

U.S. PATENT DOCUMENTS

| | | | |
|---|---|---|---|
| 9,232,443 B2 | 1/2016 | Fu et al. | |
| 9,282,511 B2 | 3/2016 | Kim et al. | |
| 9,351,252 B2 | 5/2016 | Knowles | |
| 9,420,625 B2* | 8/2016 | Park | H04W 76/38 |
| 9,713,087 B2* | 7/2017 | Asterjadhi | H04W 52/0274 |
| 9,754,202 B2 | 9/2017 | Gudan et al. | |
| 9,787,355 B2* | 10/2017 | Tian | H04B 1/707 |
| 9,807,689 B2* | 10/2017 | Oishi | H04W 52/0229 |
| 9,973,903 B2* | 5/2018 | Cherian | H04W 4/06 |
| 2008/0170526 A1 | 7/2008 | Narang et al. | |
| 2010/0157865 A1* | 6/2010 | Iyer | H04W 52/0216 370/311 |
| 2011/0007678 A1* | 1/2011 | Kneckt | H04W 40/10 370/311 |
| 2012/0190397 A1* | 7/2012 | Jung | H04W 4/08 455/519 |
| 2013/0077546 A1* | 3/2013 | Liu | H04W 52/0216 370/311 |
| 2013/0150108 A1* | 6/2013 | Yang | H04W 52/0216 455/509 |
| 2013/0223305 A1* | 8/2013 | Doppler | H04W 52/0216 370/311 |
| 2014/0269473 A1* | 9/2014 | Kondabattini | H04W 52/0209 370/311 |
| 2014/0313957 A1* | 10/2014 | Bao | H04W 52/0235 370/311 |
| 2014/0341101 A1* | 11/2014 | Ganapathy | H04W 52/0206 370/311 |
| 2015/0103716 A1* | 4/2015 | Xu | H04W 52/0274 370/311 |
| 2015/0327204 A1* | 11/2015 | Park | H04W 56/0015 370/350 |
| 2016/0316428 A1* | 10/2016 | Wen | H04W 52/0206 |
| 2016/0323820 A1* | 11/2016 | Wong | H04L 5/0055 |
| 2016/0353253 A1* | 12/2016 | Cherian | H04W 52/0241 |
| 2017/0006548 A1* | 1/2017 | Guo | H04L 69/28 |
| 2017/0142661 A1* | 5/2017 | Wong | H04W 52/0274 |
| 2017/0192486 A1* | 7/2017 | Park | G06F 3/165 |
| 2017/0223700 A1* | 8/2017 | Thubert | H04L 45/22 |
| 2017/0273017 A1* | 9/2017 | Gidvani | H04W 24/10 |
| 2017/0311113 A1* | 10/2017 | Abraham | H04W 4/70 |
| 2017/0366249 A1* | 12/2017 | Van Oost | H04B 7/15557 |
| 2018/0103403 A1* | 4/2018 | Van Lieshout | H04W 36/14 |
| 2018/0146398 A1* | 5/2018 | Kim | H04W 28/065 |
| 2018/0146467 A1* | 5/2018 | Kim | H04W 72/0406 |
| 2018/0152886 A1* | 5/2018 | Naftali | H04W 52/0216 |
| 2018/0152894 A1* | 5/2018 | Lin | H04W 52/0241 |
| 2019/0158469 A1* | 5/2019 | Gonzalez | H04L 63/0428 |

OTHER PUBLICATIONS

Ben Gilboa, Texas Instruments "SimpleLink™ CC3100/CC3200 Wi-Fi Internet-on-a-chipm Networking Sub-system Sower Management", Sep. 2014, 18 pages.

Written Opinion and Search Report of the International Searching Authority for International Application No. PCT/US18/58756 dated Dec. 11, 2018; 13 pages.

* cited by examiner

REDUCING POWER CONSUMPTION IN COMPUTING DEVICES WITH WIRELESS NETWORK INTERFACES

CROSS-REFERENCE TO RELATED APPLICATIONS

This application claims the benefit of U.S. Provisional Application No. 62/609,546 filed on Dec. 22, 2017, the entire contents of which are hereby incorporated by reference.

BACKGROUND

A computing device may communicate with other computing devices via one or more networks. One type of network may be a wireless network. The computing device may use a network interface (e.g., an internet-of-things device) to transmit data to or receive data from the wireless network (e.g., to transmit or receive radio-frequency signals).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6A illustrates an example frame, in accordance with some embodiments of the present disclosure.

FIG. 6B illustrates an example field of a frame, in accordance with some embodiments of the present disclosure.

DETAILED DESCRIPTION

A computing device may communicate with other computing devices via one or more networks. One type of network may be a wireless network. The computing device may use a network interface (e.g., an internet-of-things (IOT) device) to transmit data to or receive data from the wireless network (e.g., to transmit or receive radio-frequency signals). Transmitting or receiving data via a wireless network may cause the network interface to consume more power because the network interface may use power to operate a radio (or other components) that is used to transmit or receive radio-frequency signals (e.g., wireless signals). Power efficiency may be a concern for the computing device or the network interface. For example, the computing device or the network interface my operate on battery power and efficient use of power may allow the computing device or network interface to operate for longer periods of time without charging the battery.

The examples, implementations, and embodiments described herein may allow for more efficient power usage when transmitting or receiving data using a network interface. The network interface may coordinate with a computing device to determine whether there is data to be transmitted, when the data should be transmitted, or how much data should be transmitted. This may allow the network interface to transition between power states (e.g., between an active state or a reduced power state) more quickly and efficiently, which may increase the power efficiency of the network interface.

Figure 1:
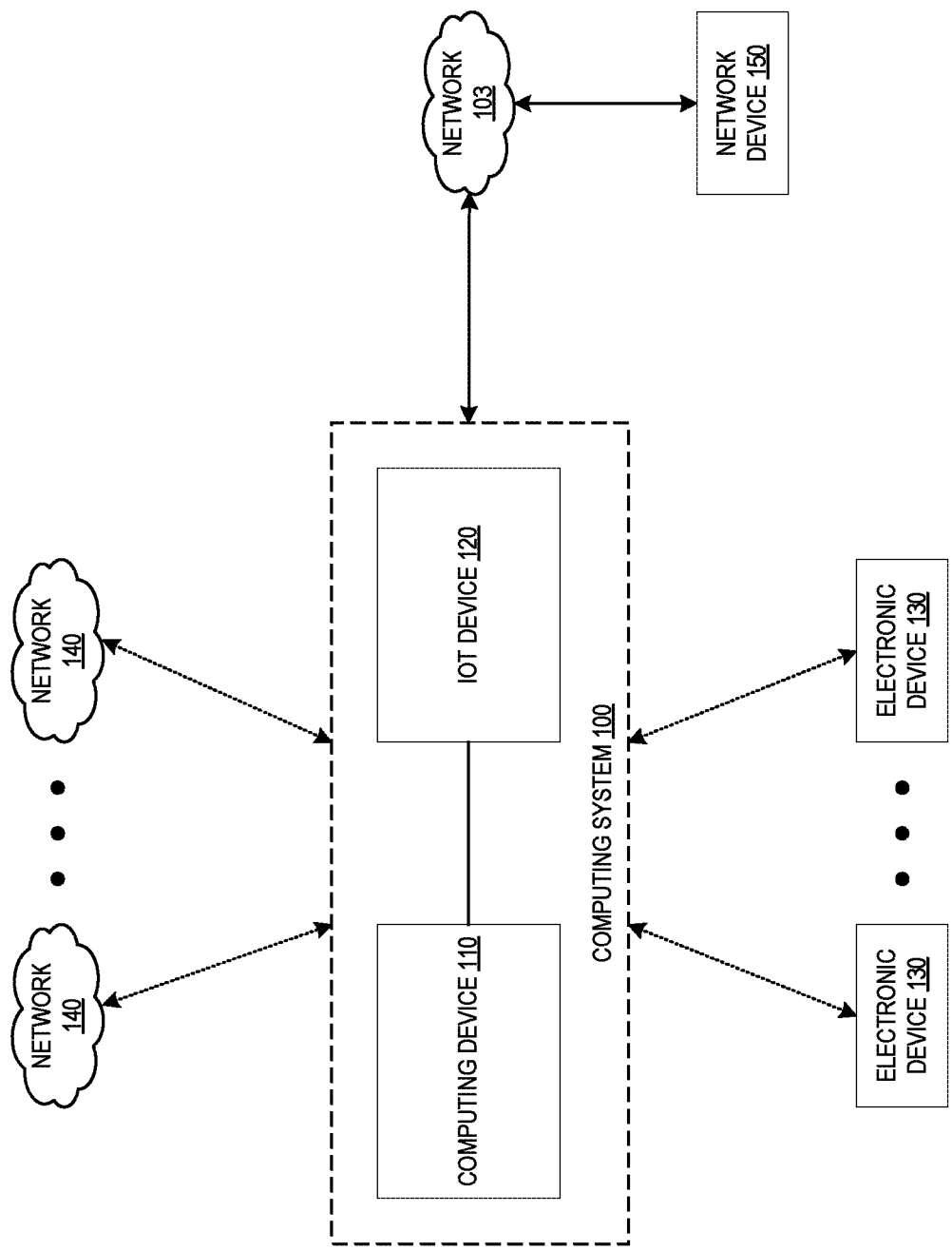
FIG. 1 illustrates a system architecture, in accordance with some embodiments of the present disclosure.

FIG. 1 illustrates a computing system 100, in accordance with some embodiments of the present disclosure. The computing system 100 includes a computing device 110, and an internet-of-things (IOT) device 120. The computing device 110 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing device 110 may comprise any suitable type of computing device or machine that has a programmable processor including, for example, server computers, desktop computers, laptop computers, tablet computers, smartphones, personal digital assistants (PDAs), set-top boxes, etc. In some examples, the computing device 110 may comprise a single machine or may include multiple interconnected machines (e.g., multiple servers configured in a cluster). The computing device 110 may execute or include an operating system (OS). The OS of the computing device 110 may manage the execution of other components (e.g., software, applications, etc.) and/or may manage access to the hardware (e.g., processors, memory, storage devices etc.) of the computing device.

The IOT device 120 may allow the computing device 110 to communicate with other devices (e.g., other computing devices or other network devices, such as a router or a server). For example, the IOT device 120 may allow the computing device 110 to communicate data (e.g., transmit or receive messages, packets, frames, data, etc.) via wired or wireless infrastructure. In one embodiment, the IOT device 120 may be a network interface for the computing device 110. For example, the IOT device 120 may be a network adaptor that may be coupled to the network 103 (e.g., via a wireless medium such as radio-frequency (RF) signals). In some embodiments, the computing system 100 (e.g., the IOT device 120) and the network device 150 may communicate with each other using one of the 802.11 standards (e.g., 802.11a, 802.11b), 802.11g, 802.11ac, 802.11n, etc.). Although the IOT device 120 is shown as separate from the computing device 110, the IOT device 120 may be part of the computing device 110 in other embodiments. For example, the IOT device 120 may be installed or located within a housing (e.g., a case, a body, etc.) of the computing device 110.

The computing system 100 may communicate with other devices via network 103, as discussed in more detail below. For example, the computing system 100 (e.g., the computing device 110) may transmit and/or receive data, packets, messages, frames, etc., to another device (e.g., a server computer, another computing device, etc.) via network 103. Network 103 may be a public network (e.g., the internet), a private network (e.g., a local area network (LAN) or wide area network (WAN)), or a combination thereof. In one embodiment, network 103 may include a wired or a wireless infrastructure, which may be provided by one or more wireless communications systems, such as a wireless fidelity (Wi-Fi) hotspot connected with the network 103 and/or a wireless carrier system that can be implemented using various data processing equipment, communication towers (e.g. cell towers), etc. The network 103 may carry communications (e.g., data, message, packets, frames, etc.) between computing device 110 and other devices (e.g., electronic devices, network devices, computing devices, etc.). In some embodiments, the network 103 may be a wireless network that uses one of the 802.11 standards (e.g., 802.11a, 802.11b), 802.11g, 802.11ac, 802.11n, etc.). A network that uses one of the 802.11 standards may be referred to as a Wi-Fi network or a WiFi network.

As illustrated in FIG. 1, the computing system 100 may be also be coupled to one or more networks 140 (e.g., may also transmit and/or receive data with other devices via the one or more networks 140). Also as illustrated in FIG. 1, the computing system 100 may also be coupled to be one or more electronic devices 130. For example, the computing device 110 may be able to detect or may be connected to a Bluetooth speaker, a sensor (e.g., a temperature sensor), etc.

In embodiment, the computing system 100 may communicate (e.g., transmit and/or receive) data with a network device 150 via the network 103. For example, the computing system 100 may transmit data to another device (e.g., a server computer) via the network 103. The network 103 may be provided or hosted by the network device 150. In some embodiments, the network device 150 may be a wireless router, a wireless access point, etc. For example, the network device 150 may be router (e.g., a network device that forwards data, such as messages, packets, frames, etc.) between networks. The network device 150 may also be a first-hop router. A first-hop router may be a router that is coupled to both a LAN (e.g., a Wi-Fi network) and WAN. For example, a first-hop router may allow devices (e.g., computing devices) which are coupled to a Wi-Fi network (e.g., a LAN) to communicate with or access the Internet (e.g., a WAN).

Power consumption may be an issue for the computing system 100. For example, the computing system 100 (e.g., the computing device 110 and the IOT device 120) may operate using battery power. In another example, power efficiency may be desirable for the computing system 100. However, generally, when a computing system 100 transmits data, the computing system 100 may be in an active state for a longer period of time than necessary to transmit the data. For example, when using 802.11 standards or protocols (e.g., Wi-Fi standards or protocols), the computing system 100 may transmit data but may not transition to a reduced power state (e.g., a state that uses less power, as discussed in more detail below) for a period of time even though the computing system 100 is done transmitting data.

In some embodiments, the computing device 110 may transmit data to other devices (via the network 103) in a more predictable pattern. For example, the computing device 110 may be a security camera that uses the IOT device 120 to transmit data (e.g., status messages) to another device (e.g., to a user's computing device, to a server computer, etc.) periodically. In addition, the computing device 110 may not receive data from other devices (e.g., receive data from the network 103 or the network device 150) very frequently. This may allow the IOT device 120 to operate more efficiently (e.g., to use less power, to be more power efficient) by coordinating with the computing device 110 to determine when the IOT device 120 should be in an active state or in a reduced power state, as discussed in more detail below.

Figure 2:
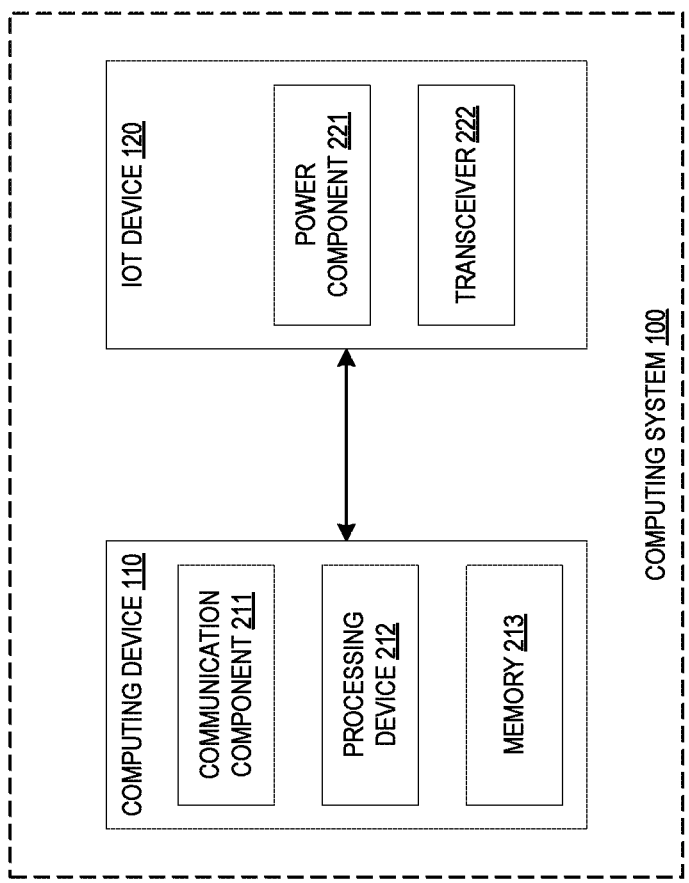
FIG. 2 illustrates a computing system, in accordance with some embodiments of the present disclosure.

FIG. 2 illustrates a computing system 100, in accordance with some embodiments of the present disclosure. As discussed above, the computing system 100 includes computing device 110 (e.g., a smartphone, a PDA, a tablet computer, a laptop computer, a desktop computer, etc.) and an IOT device 120 (e.g., a network adaptor, a Wi-Fi adaptor, a network interface, a Wi-Fi interface, etc.). The computing system 100 may be coupled to a network (e.g., network 103 illustrated in FIG. 1), as discussed above. The computing system 100 may communicate with a network device (e.g., a router, access point, etc., such as network device 150 illustrated in FIG. 1) via the network.

The computing device 110 includes a communication component 211, a processing device 212, and a memory 213. The processing device 212 may be one or more of processors, central processing units (CPUs), application specific integrated circuits (ASICs), field programmable gate arrays (FPGAs), etc. The memory 213 may be one or more of a random access memory (RAM), storage devices (e.g., a hard-disk drive (HDD), a solid-state drive (SSD), etc.), a cache, etc. The communication component 211 may be hardware, software, firmware, or a combination thereof. In some embodiments, the communication component 211 may be executed using one or more of the processing device 212 and the memory 213.

The IOT device 120 includes a power component 221 and a transceiver 222. The power component 221 may be hardware, software, firmware, or a combination thereof. The transceiver 222 may include hardware, software, or firmware that may be used to transmit and receive radio-frequency signals. For example, the transceiver 222 may include an antenna, a radio, etc. The computing device 110 may use the IOT device 120 to transmit and receive data to other devices (e.g., sever computers, network devices, other computing devices, etc.) or networks. In some embodiments, the transceiver 222 may transmit and receive radio-frequency signals. For example, the transceiver 222 my transmit radio-frequency signals to another device or may receive radio-frequency signals transmitted by another device.

The IOT device 120 may operate in different power states. In one embodiment, the IOT device 120 may operate in an active state. In the active state, the transceiver 222 may be turned on which may cause the IOT device 120 to use more power. The IOT device 120 may be able to transmit data to devices and networks in the active state. In another embodiment, the IOT device 120 may operate in a reduced power state (e.g., a lower power state). In the reduced power state, the IOT device 120 may power down one or more portions of the IOT device 120. For example, the IOT device 120 may power down the transceiver 222 in the reduced power state. The IOT device 120 may not transmit data in the reduced power state. When in the reduced power state, the IOT device 120 may consume or may use less power than when in the active state.

In some embodiments, the power component 221 may determine whether the computing device 110 has data to transmit (e.g., data to transmit to a server computer). In one embodiment, the power component 221 may determine whether the computing device 110 has data to transmit by analyzing a message (or a frame, a packet, a data unit, etc.) received from the computing device. The message may indicate the amount of data that the computing device 110 has to transmit to another device (e.g., a server computer, another computing device, etc.). For example, the message may indicate that the computing device 110 has twenty, one hundred, or some appropriate number of packets to transmit. In another example, the message may indicate that the size (e.g., the number of bytes, kilobytes, megabytes, etc.) of data that the computing device 110 has to transmit to another device. Based on the message (indicating the amount of data that the computing device 110 has to transmit), the power component 221 may determine when the computing device 110 will be done transmitting data to the other device (e.g., will be done after a certain number of packets or a certain number of bytes, kilobytes, megabytes, etc.). In another example, the message may indicate that the computing device 110 does not have additional data to transmit. For example, if the computing device 110 has ten messages (or packets, frames, etc.) to transmit, the tenth message may indicate that the tenth message is the last message and the computing device 110 does not currently have additional data to transmit. In some embodiments, the indication that the computing 110 does not currently have additional data to transmit may be included in a separate message, or may be included in an existing message. For example, if the computing device 110 has five messages to transmit, the computing device 110 may transmit a sixth message indicating that the computing device 110 does not currently have additional data to transmit. In another example, if the computing device 110 has two messages to transmit, the second message may include a field, parameter, setting, flag, or other appropriate indicator, indicating that the computing device 110 currently has no additional data to transmit. For example, if the message is an 802.11 frame or packet, the 802.11 frame or packet may include a Power Management field that may indicate that the IOT device 120 is transitioning to the reduced power state.

In one embodiment, the power component 221 may cause the IOT device 120 to remain in the active state in response to determining that the computing device 110 still has data to transmit. For example, if a message from the computing device 110 indicates that the computing device 110 still has an amount of data to transmit, the power component 221 may keep the IOT device 120 (or portions of the IOT device 120, such as the transceiver 222) in the active state. In another example, the computing power component 221 may allow the transceiver 222 to remain on (e.g., powered on), and to continue transmitting or receiving data.

In another embodiment, the power component 221 may determine whether the computing device 110 has data to transmit to the network device by analyzing a schedule. The schedule may indicate periods of time that the computing device 110 may have data to transmit to the network device. For example, the computing device 110 may periodically transmit status messages (e.g., messages indicating the condition, state, or status of the computing device 110). The computing device 110 may provide a schedule indicating when the computing device 110 may transmit the status messages (e.g., indicating certain time, indicating that the messages may be transmitted once per hour, etc.). The power component 221 may receive the schedule and may analyze the schedule to determine when the computing device 110 may be transmitting data to another device and when the computing device 110 may no data to transmit. In some embodiments, the schedule may also indicate how much data (e.g., how many packets, the size or amount of data, etc.) that the computing device 110 may transmit at the times indicated in the schedule. Although the present disclosure may refer to a schedule, other methods or data structures may be used to indicate when the computing device 110 will transmit data or indicate the amount of data that will be transmitted, may be used in other embodiments.

In one embodiment, the power component 221 may transmit a message to a network device (e.g., a router, an access point, etc.) indicating that the computing device 110 or the IOT device 120 does not have data to transmit (e.g., data to transmit to another device or to the network device), in response to determining that the computing device 110 does not have data to transmit (e.g., when the computing device 110 does not currently have data to transmit). For example, the power component 221 may transmit a message with a flag, field, parameters, indicating that the computing device 110 does not currently have data to transmit. In another embodiment, the power component 221 may transmit a message indicating that the IOT device 120 (or portions of the IOT device, such as the transceiver 222) is transitioning to a lower power state or a reduced power state. For example, the power component 221 may transmit a data packet (e.g., a last data packet) and the data packet may include a field, parameter, etc., such as a power management (Power Management field in the Frame Control field of an 802.11 frame, as discussed in more detail below) field that indicates that the IOT device 120 is transitioning to a reduced power state. In another example, the power component 221 may transmit a null data packet (NDP) and the NDP may include the field In one embodiment, the power component 221 may transition the IOT device 120 (or portions of the IOT device, such as the transceiver 222) to the reduced power state in response to determining that the computing device 110 does not currently have data to transmit. For example, the power component 221 may power off the transceiver 222. In another example, the power component 221 may refrain from transmitting data or radio-frequency signals.

In some embodiments, the computing device 110 may transmit data unexpectedly (e.g., not according to a schedule or not periodically) when events, conditions, etc., occur. For example, the computing device 110 may be a security camera and when the security camera detects movement, it may transmit messages that include the video (e.g., video data, video frames, etc.) recorded by the security camera. In another example, the computing device 110 may be a sensor (e.g., a temperature sensor) and the sensor may continue to transmit data (e.g., messages that may indicate the detected temperature) while certain conditions, activities, occurrences, events, etc., are detected by the sensor. Because the computing device 110 may not be able to determine when it will stop transmitting data (e.g., due to the randomness or unpredictability of the conditions, activities, occurrences, events, etc.) the computing device 110 may not be able to transmit a message to the IOT device 120 indicating when it will stop transmitting data. The power component 120 may use a transmit inactivity timer to determine when to transition the IOT device 120 to a reduced power state. The transmit inactivity timer may be an amount of time that may allow the power component 120 to determine that the computing device 110 does not currently have data to transmit. For example, the power component 120 may determine that the computing device 110 has not provided data to the IOT device 120 to transmit for the duration of the transmit inactivity timer (e.g., for five seconds, for twenty seconds, or some other appropriate period of time). The power component 120 may transition the IOT device 120 to the reduced power state after the transmit inactivity timer has elapsed and the computing device 110 has not provided data to the IOT device 120 to transmit.

In one embodiment, the power component 221 may periodically transition the IOT device 120 (or portions of the IOT device 120) to the active state. For example, the computing device 110 may periodically transmit status messages to another device (e.g., a server computer) as discussed above. The power component 221 may be aware of that the computing device 110 will transmit data periodically or according to a schedule. For example, the computing device 110 may provide a schedule to the power component 221, as discussed above. When the computing device 110 has data to transmit (e.g., when the computing device 110 periodically transmits status messages or transmits status messages according to a schedule), the power component 221 may transition the IOT device 120 to the active state for a period of time. The IOT device 120 may transmit data (e.g., messages, packets, frames, etc.) during the period of time. For example, the IOT device 120 may transmit messages while the transceiver 222 is active during the period of time. After the period of time has elapsed, the power component 221 may transition the IOT device 120 back to the reduced power state. The period of time that the computing device 110 may periodically transmit data or may be scheduled to transmit data, may be less than the transmit inactivity timer that may be used when the IOT device 120 is transmitting data.

In one embodiment, the power component 221 may determine that the computing device 110 still has data to transmit. The power component 221 may cause the IOT device 120 to remain in the active state in response to determining that the computing device 110 still has data to transmit. For example, the power component 221 may not transition the IOT device 120 (or portions of the IOT device 120, such as the transceiver 222), to the reduced power state. In another example, the power component may not turn off the transceiver 222, or may continue to transmit and receive data.

In one embodiment, the power component 221 determine whether a network device (e.g., a wireless router, a wireless access point, etc.) has data to transmit to the computing device 110 during a beacon period. The beacon period may be periods of time where the network device (e.g., the access point, router, etc.) may inform the IOT device 120 that the network device has data to be transmitted to the computing device 110. The network device may communicate the beacon periods to the IOT device 120 (e.g., may provide a schedule of the beacon periods) when the IOT device 120 registers or connects with the network device (e.g., when the IOT device accesses a wireless network provided by the network device). The IOT device 120 may listen to beacon data, a beacon channel, a beacon signal, etc., to determine whether the network device has data to be communicated to the computing device 110. For example, the IOT device 120 may listen to a beacon channel to determine whether an identifier for the IOT device 120 or computing device 110 (e.g., an internet protocol (IP) address, a medium access control (MAC) channel, etc.) is being transmitted in a message on the beacon channel. The IOT device 120 may remain in the reduced power state while the IOT device 120 listens to the beacon channel during the beacon period. For example, the IOT device 120 may be able to remain in the reduced power state because the transceiver may not use as much power listening to a beacon channel as opposed to transmitting data (e.g., transmitting messages, packets, frame, etc., by transmitting radio-frequency signals).

In one embodiment, the power component 221 may cause the IOT device 120 to remain in the reduced power state if the power component 221 determines that the network device does not have data to transmit to the computing device 110. For example, if the identifier for the IOT device 120 or computing device 110 is transmitted in a message on the beacon channel, this may indicate that the network device has data (e.g., messages, packets, frames, etc.) to transmit to the computing device 110. The power component 221 may transition the IOT device 120 to the active state so that the IOT device 120 may receive the data from the network device and may transmit acknowledgements (e.g., acknowledgement (ACK) messages, ACK packets, etc.) to the network device confirming the receipt of the data.

In another embodiment, the power component 221 may transition the IOT device 120 to the active state if the power component 221 determines that the network device has data to transmit to the computing device 110. For example, if the identifier for the IOT device 120 or computing device 110 is not transmitted in a message on the beacon channel, this may indicate that the network device does not have data (e.g., messages, packets, frames, etc.) to transmit to the computing device 110. The power component 221 may refrain from transitioning the IOT device 120 to the active state in response to determine that the network device does not have data to transmit to the computing device 110 (e.g., may not power up the transceiver 222).

In one embodiment, the power component 221 may use a receive inactivity timer to determine when to transition the IOT device 120 from the active state to the reduced power state. For example, after receiving some data from the network device the power component 221 may determine that data has not been received from the network device for a period of time (e.g., that the receive inactivity timer has elapsed and data has not been received from the network device). The power component 221 may transition the IOT device 120 from the active power state to the reduced power state after the receive inactivity timer has elapsed. In different embodiments, the receive inactivity timer may be the same as the transmit inactivity timer or may different from the transmit inactivity timer.

In one embodiment, the communication component 211 may determine whether the computing device 110 has data (e.g., messages, packets, frames, etc.) to transmit to another device (e.g., a server computer, another computing device, etc.). For example, the computing device 110 may be a security camera and the communication component 211 may determine that motion has not been detected by the security camera. In another example, the computing device 110 may be a sensor and the communication component 211 may determine that certain conditions have not occurred. In a further example, the communication component 211 may determine that the computing device 110 is not scheduled to transmit data. The communication component 211 may provide an indication to the IOT device 120 that there is currently no data to transmit to another device (e.g., to the network device, to another computer device, etc.).

In one embodiment, the communication component 211 may provide the indication (that there is currently no data to transmit to another device) in a separate message to the IOT device 120, indicating that the computing device 110 does not currently have data to transmit, as discussed above. For example, the communication component 211 may transmit a separate message to the IOT device 120 indicating that there is currently no data to transmit. In another embodiment, the communication component 211 may provide the indication that there is currently no data to transmit to another device)

by including the indication in an existing message that was to be transmitted to another device. For example, the communication component 211 may set a flag, parameter, setting, etc., in a message that is to be transmitted to the other device. In a further embodiment, the communication component 211 may provide the indication (that there is currently no data to transmit to another device) by providing (e.g., transmitting a schedule) to the IOT device 120, as discussed above. The schedule may indicate periods of time when the computing device 110 may transmit data to another device and may include the amount of data that will be transmitted to the other device.

In one embodiment, the communication component 211 may aggregate data that is to be transmitted to the other device (e.g., to the network device, to another computing device, etc.). For example, the computing device 110 may collect data so that the data may be transmitted to the other device in one batch (e.g., so the aggregated or collated data may be transmitted in one transmission or during one transition of the IOT device 120 from the reduced power state to the active state). For example, communication component 211 may aggregate data into aggregated medium access control (MAC) service data units (AMSDUs) or aggregated MAC protocol data units (AMPDUs).

As discussed above, the computing device 110 may transmit data unexpectedly (e.g., not according to a schedule or not periodically) when events, conditions, etc., occur. When the computing device 110 has data to transmit unexpectedly, the communication component 211 may transmit the data (e.g., messages, frames, packets, etc.) to the IOT device 120. When the computing device 110 no longer has unexpected data to transmit, the IOT device 120 may use a transmit inactivity timer to determine when to transition the IOT device 120 to a reduced power state.

Figure 3A:
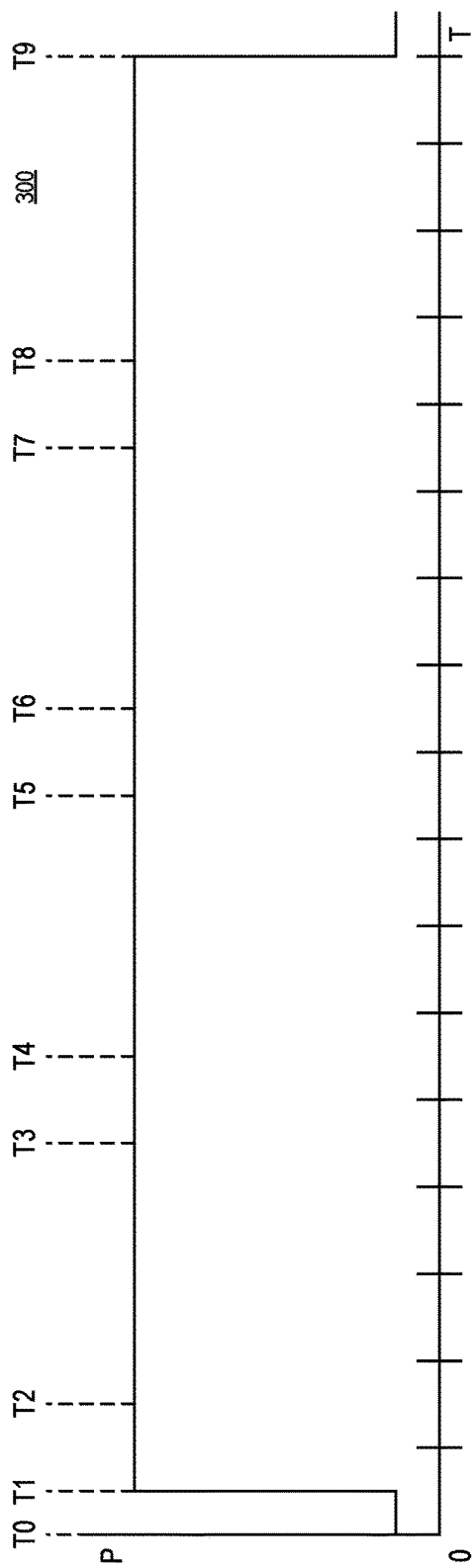
FIG. 3A is an example graph illustrating power consumption of a device, in accordance with some embodiments of the present disclosure.

FIG. 3A is an example graph 300 illustrating power consumption of a device, in accordance with some embodiments of the present disclosure. The device may be an IOT device (e.g., IOT device 120 illustrated in FIG. 2) or a computing system (e.g., computing system 100 illustrated in FIG. 2). The Y-axis of the graph indicates the amount of power (P) consumed or used by the device. The X-axis of the graph indicates different times (T). Thus, the graph 300 illustrates the amount of power consumed or used by the device over a period of time.

The device may initially be in a reduced power state at time T0. As discussed above, the device may transmit data for a period of time between time T1 and time T3. For example, although the device may transmit data according to a schedule, the device may unexpectedly have data to transmit, as discussed above. When transmitting data, the device may transition to an active state at time T1 which causes the power consumption of the device to increase. At time T2, the device may stop transmitting data. However, the device may remain in the active state because a transmit inactivity timer has not expired (e.g., the transmit inactivity timer is longer than the time between time T2 and time T3). At time T3 the device may transmit data until time T4. However, the device may still remain in the active state because the transmit inactivity timer has not expired (e.g., the transmit inactivity timer is longer than the time between time T4 and time T5). At time T5 the device may transmit data until time T6. However, the device may still remain in the active state because the transmit inactivity timer has not expired (e.g., the transmit inactivity timer is longer than the time between time T6 and time T6). At time T7 the device may transmit data until time T8. The device may wait for the transmit inactivity timer to expire. At time T9, the transmit inactivity timer may expire. The device may transmit a null data packet (NDP) (e.g., a type of 802.11 frame or packet) with the Power Management bit set to "1" to indicate that the device is transitioning to a reduced power state. After the transmit inactivity timer expires, the device may transition to the reduced power state at time T9 which decreases the power consumption of the device.

In some embodiments, the device may also listen to or monitor a beacon channel to determine if a network device has data to transmit to the computing device, as discussed above. The device may listen to or monitor the beacon channel at the times indicated by the hash marks along the X-axis. The device may listen to or monitor the beacon channel in both the active state and the reduced power state, as discussed above.

Figure 3B:
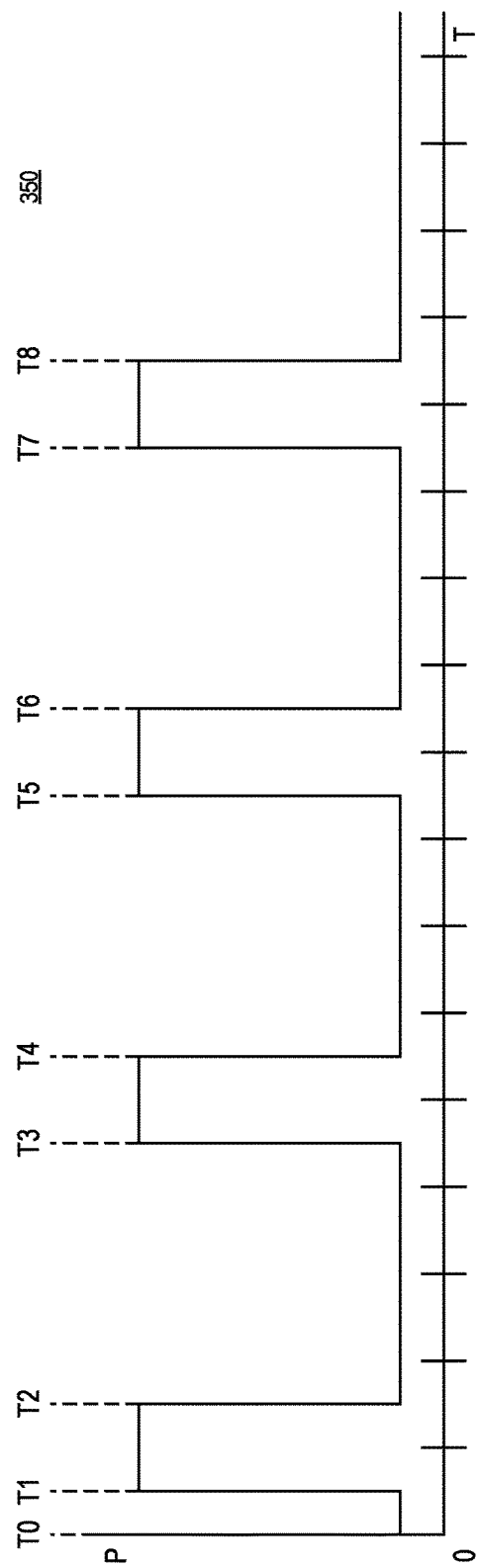
FIG. 3B is an example graph illustrating power consumption of a device, in accordance with some embodiments of the present disclosure.

FIG. 3B is an example graph 350 illustrating power consumption of a device, in accordance with some embodiments of the present disclosure. The device may be an IOT device (e.g., IOT device 120 illustrated in FIG. 2) or a computing system (e.g., computing system 100 illustrated in FIG. 2). The Y-axis of the graph indicates the amount of power (P) consumed or used by the device. The X-axis of the graph indicates different times (T). Thus, the graph 350 illustrates the amount of power consumed or used by the device over a period of time.

The device may initially be in a reduced power state at time T0. As discussed above, the device may transmit data for a period of time between time T1 and time T2. For example, the device may transmit status messages according to a schedule, as discussed above. When transmitting data, the device may transition to an active state at time T1 which causes the power consumption of the device to increase. At time T2, the device may stop transmitting data and the device may transition to the reduced power state which decreases the power consumption of the device. At times T3, T5, and T7, the device may transmit data (according to the schedule) and may transition to the active state. At times T4, T6, and T8, the device may stop transmitting data and the device may transition to the reduced power state.

In one embodiment, the device may also listen to or monitor a beacon channel to determine if a network device has data to transmit to the computing device, as discussed above. The device may listen to or monitor the beacon channel at the times indicated by the hash marks along the X-axis. The device may listen to or monitor the beacon channel in both the active state and the reduced power state, as discussed above.

In some embodiments, a wireless device (such as device that uses 802.11 standards or Wi-Fi standards) may remain in an active state for a period of time even though the device does not have enough data to continuously transmit during the period of time. This may result in the power consumption illustrated in FIG. 3A. However, if the device is provided a schedule of when data should be transmitted, the device may be able to reduce the power consumption by transition to the reduced power state when it does not have data to transmit, as illustrated in FIG. 3B. For example, when the device may transmit a last 802.11 frame or packet, the device may set the Power Management field of the last 8021.11 frame or packet to "1" to indicate to the network device that the device is transitioning to the reduced power state after transmitting the 802.11 frame or packet. Because the device is aware of how much data a computing device has to transmit, the device is able to set the Power Management field in the last packet or frame, rather than waiting for a transmit inactivity timer to expire and then transmitting a separate NDP, as discussed above. This may allow the device to operate more efficiently (e.g., may allow the device to be more power efficient, to reduce power consumption, to save battery power, etc.).

Figure 4:
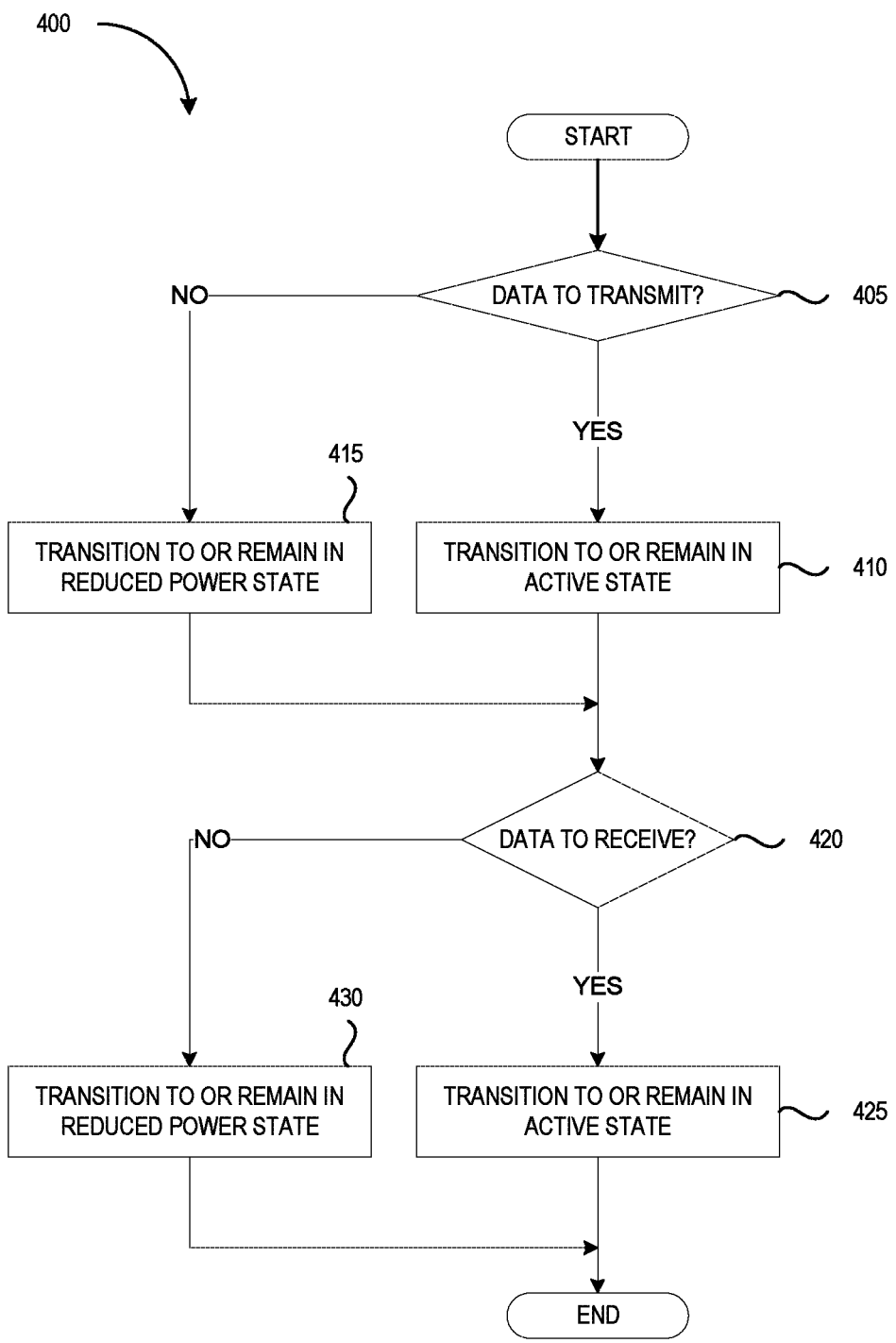
FIG. 4 is a flow diagram of a method of communicating data using a device, in accordance with some embodiments of the present disclosure.

FIG. 4 is a flow diagram of a method 400 of communicating data (e.g., transmitting and receiving data) using a device, according to some embodiments of the present disclosure. Method 400 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by a power component (e.g., power component 221 illustrated in FIG. 2), a network interface (e.g., IOT device 120 illustrated in FIG. 1), a computing system (e.g., computing system 100 illustrated in FIG. 2), or a processing device (e.g., processing device 702 illustrated in FIG. 7).

The method 400 begins at block 405, where the method 400 determines whether there is data to transmit to another device (e.g., a server computer, a network device such as a router or an access point, another computing device, etc.), as discussed above. For example, the method 400 may determine whether a message indicating that there is still data to transmit or indicating that there is currently no more data to transmit, has been received. In another example, the method 400 may determine whether there is data to transmit based on a schedule. If there is data to transmit, the method 400 may transition the device to an active power state or may remain in the active power state if the device was already in the active power state at block 410. If there is currently no more data to transmit, the method 400 may transition the device to a reduced power state or may remain in the reduced power state if the device was already in the reduced power state at block 415. As discussed above, the device may consume or use less power in the reduced power state than in the active state.

Figure 5:
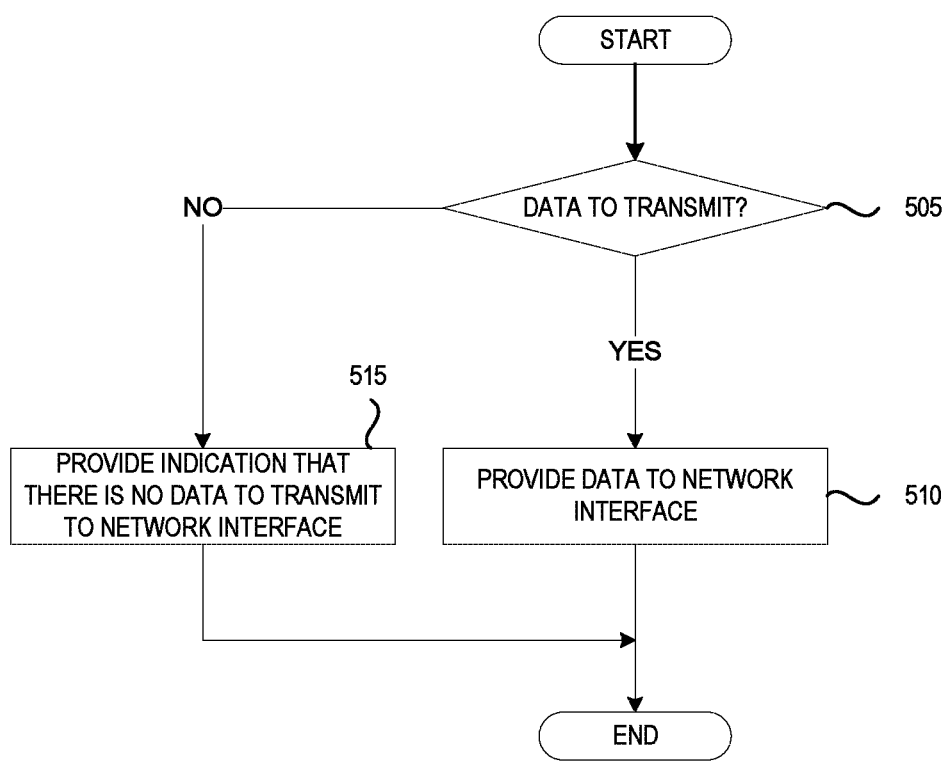
FIG. 5 is a flow diagram of a method of communicating data using a device, in accordance with some embodiments of the present disclosure.

FIG. 5 is a flow diagram of a method 500 of communicating data (e.g., transmitting and receiving data) using a device. Method 500 may be performed by processing logic that may comprise hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof. In some embodiments, the method 400 may be performed by a communication component (e.g., communication component 211 illustrated in FIG. 2), a computing device (e.g., computing device 110 illustrated in FIG. 1), a computing system (e.g., computing system 100 illustrated in FIG. 2), or a processing device (e.g., processing device 702 illustrated in FIG. 7).

Figures 6A, 6B:
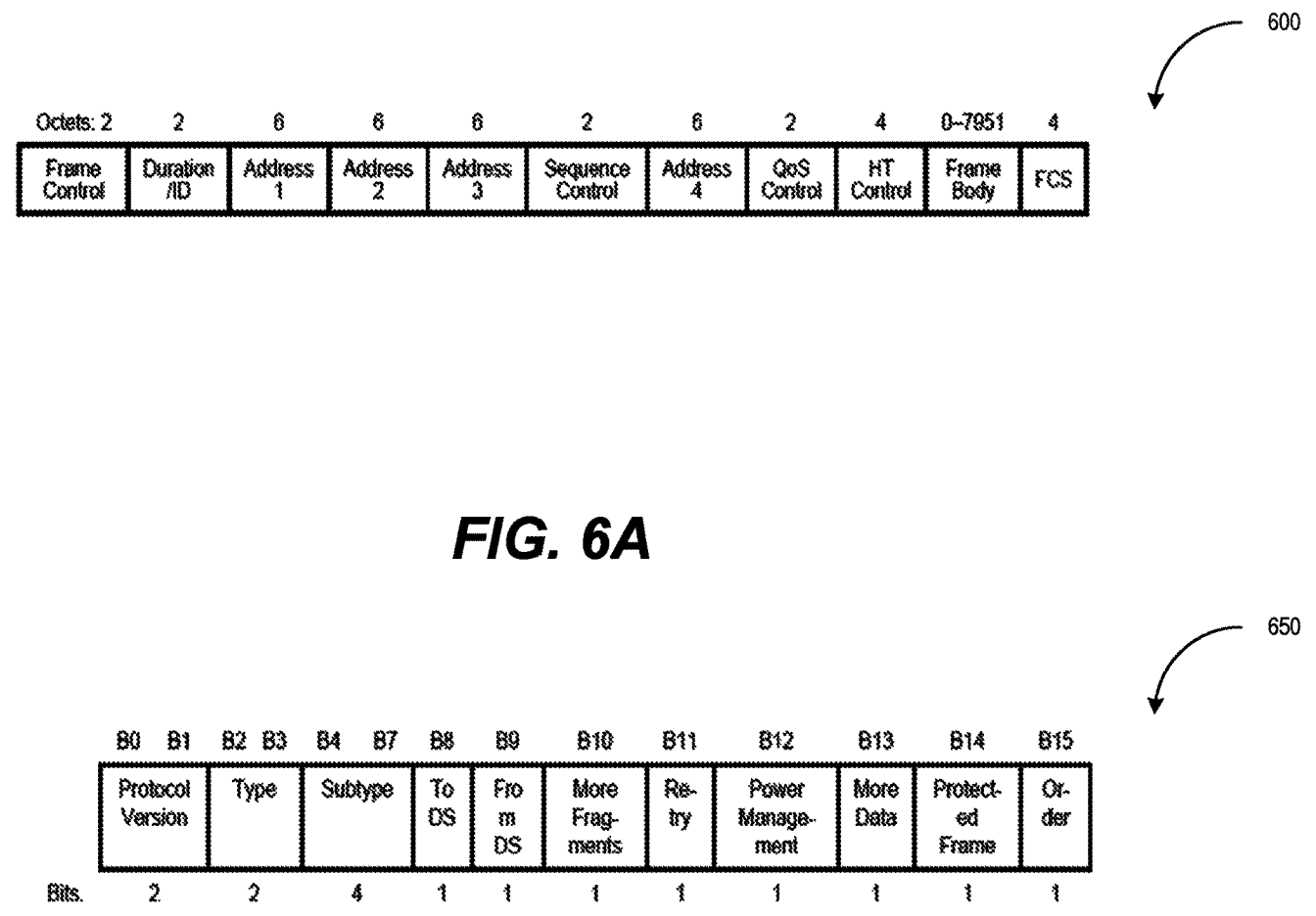

The method 500 begins at block 505, where the method 500 determines whether there is data to transmit to a network device, as discussed above. For example, the method 500 may determine whether a computing device still has data to transmit to the network device. If there is still data to transmit to the network device, the method 500 may continue to provide the data to a network interface (e.g., to an IOT device) so that the network interface may transmit the data to the network device (e.g., via a wireless network using radio-frequency signals) at block 510. If there is currently no data to transmit to the network device, the method 500 may provide an indication that there is not data to transmit to the network interface. For example, the method 500 may transmit a separate message or include a field, parameter, setting in an existing message that was to be transmitted to the network device, as discussed above. In another example, the method 500 may provide a schedule indicating when data should be transmitted or how much data will be transmitted, as discussed above FIG. 6A illustrates an example frame 600, in accordance with some embodiments of the present disclosure. In one embodiment, the frame 600 may be an 802.11 frame (e.g., a frame that follows one of the various 802.11 standards, such as 802.11n, 802.11ac, etc.). For example, the format of the frame 600 (e.g., the type, number, and size of the fields in the frame 600) may be based on one of the various 802.11 standards. As illustrated in FIG. 6A, the frame 600 includes a Frame Control field, a Duration/ID field, an Address 1 field, an Address 2 field, an Address 3 field, a Sequence Control field, an Address 4 field, a QoS Control Field, a HT Control field, a Frame Body field, and a FCS field. In some embodiments, the frame 600 may be transmitted by a network interface (e.g., IOT device 120 illustrated in FIGS. 1 and 2) to a network device (e.g., a switch, a router, an access point, etc.). The frame 600 may be transmitted in a wireless network that uses one of the various 802.11 standards.

The Frame Control field has a size of two octets (e.g., 16 bits) include data indicating the form and function of the frame. The Frame Control field is discussed in more detail below. The Duration/ID field has a size of two octets. The Duration/ID field may indicate the association identifier (ID) of the n that transmitted the frame 600 (e.g., IOT device 120 illustrated in FIGS. 1 and 2) or may indicate the duration or time that a channel will be allocated for transmission of the frame 600. The Address 1 field has a size of six octets and indicates the MAC address of the receiver (e.g., the recipient) of the frame 600. The Address 2 field has a size of six octets and indicates the MAC address of the transmitter (e.g., the network interface or IOT device 120) of the frame 600. The Address 3 field has a size of six octets and may be used by the receiver for filtering purposes.

The Sequence Control field has a size of two octets and may be used to indicating the order of the frame 600 among a plurality of frames (e.g., may indicate that the frame 600 is the tenth frame of a plurality of frames). The Address 4 field has a size of six octets may be used when the frame 600 is transmitted between network devices (e.g., between access points) in an extended service set, or between nodes in a mesh network. The QoS Control Field has a size of two octets and may indicate a quality of service for the frame 600. The HT Control field has a size of four octets. The Frame Body field may vary between 0 octets and 7951 octets. The Frame Body field may include the payload or the data that is transmitted in the frame 600. The FCS field has a size of four octets and may be used to perform integrity or error checking on the frame 600. The FCS field may also be referred to as a cyclic redundancy check.

FIG. 6B illustrates an example field 650 of a frame, in accordance with some embodiments of the present disclosure. The field 650 may be an example of the Frame Control field illustrated in FIG. 6A. As discussed above, the field 650 may be included in an 802.11 frame. The field 650 includes a Protocol Version field, a Type Field, a Subtype field, a ToDS field, a From DS filed, a Retry Field, a Power Management field, a More data field, a Protected Frame field, and an Order field.

The Protocol Version field has a size of two bits and indicates the version of the wireless protocol/standard used by the frame 600. The Type filed is two bits and indicates the type of the frame 600. The Subtype field is four bits and indicates the subtype of the frame 600. The To DS field and From DS field each have a size of one bit. The To DS field and From DS field may indicate whether the frame is headed to a distribution system or received from a distribution system respectively. The Retry Field has a size of one bit and may be used to indicate whether the frame 600 is a frame that was resent. The Power Management field has a size of one bit and may be used to indicate the state (e.g., power state) of the network interface (e.g., IOT device 120) that transmitted the frame 600, as discussed in more detail below. The More data field has a size of one bit and may be used to buffer frames transmitted by the network interface. The Protected Frame field has a size of one bit and indicates whether the frame is encrypted. The Order field has a size of one bit and may indicate when a strict ordering delivery method is used.

As discussed above, when the network interface is transmitting a last data packet or frame (e.g., when a computing device coupled to the network interface currently has no additional data to transmit), the network interface may set the Power Management field in the Frame Control Field of an 802.11 frame, to "1" to indicate that the network interface is transition to a reduced power state. When the network interface sets the Power Management field to "1" in the last data packet or frame, this may allow the network interface to transition to the reduced power state immediately after or soon after transmitting the last data packet or frame (instead of waiting for an inactivity timer to expire before transitioning to the reduced power state). This may also allow the network interface to inform a network device (e.g., an access point, a router, a switch, etc.) that the network device is transitioning to the reduced power state immediately after or soon after transmitting the last data packet or frame, so that the network device can use the beacon periods to transmit data to the network interface (as discussed above).

Figure 7:
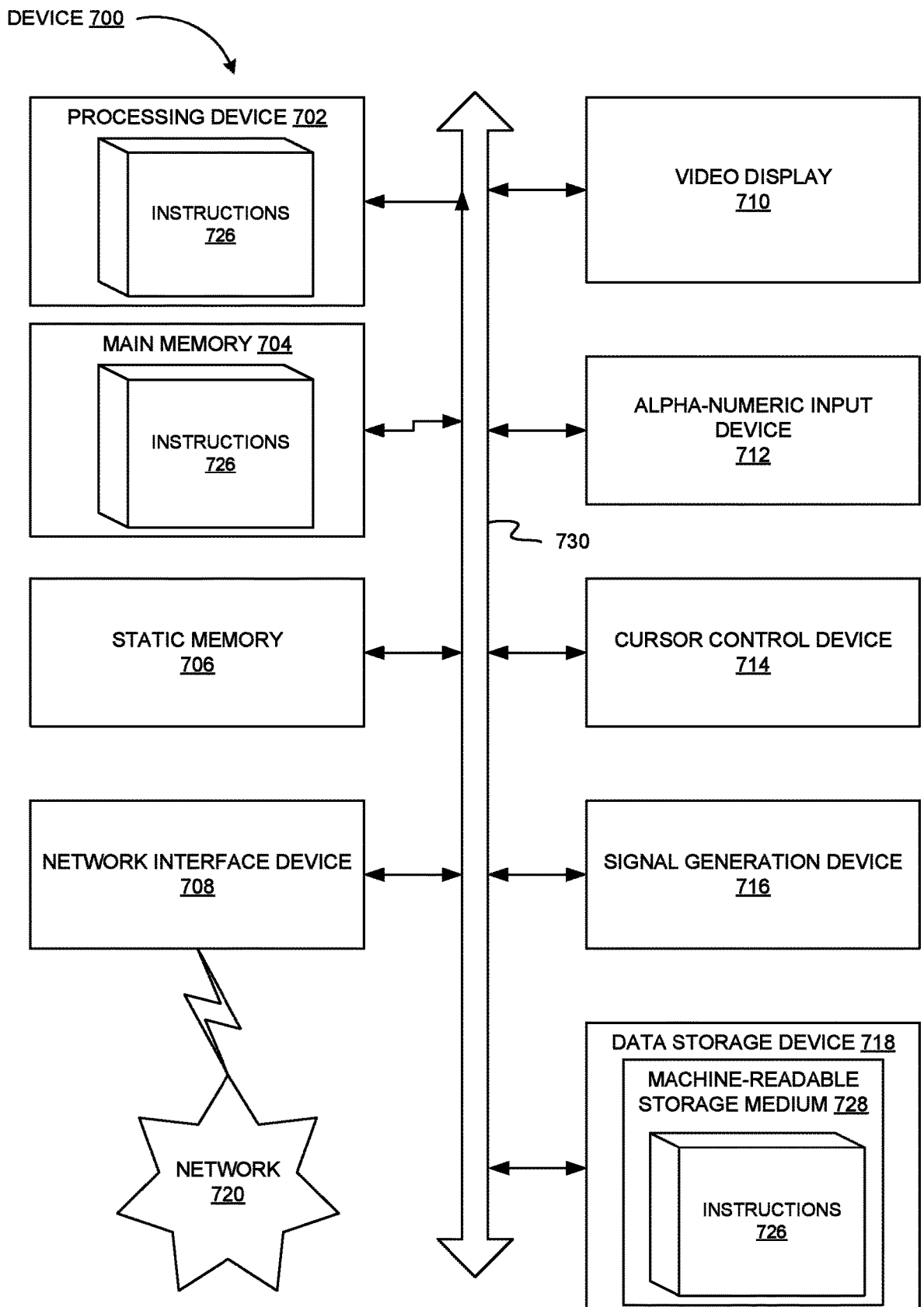
FIG. 7 is a block diagram of an example device that may perform one or more of the operations described herein, in accordance with some embodiments of the present disclosure.

FIG. 7 is a block diagram of an example device 700 that may perform one or more of the operations described herein, in accordance with some embodiments. Device 700 may be connected to other devices in a LAN, an intranet, an extranet, and/or the Internet. The device may operate in the capacity of a server machine in client-server network environment or in the capacity of a client in a peer-to-peer network environment. The device may be an electronic or computing device (such as a personal computer (PC), a tablet computer, a PDA, a smartphone, a set-top box (STB), a server computer, etc.), a network device (such as a router, switch or bridge), a network interface (e.g., an IOT device), a computing system, or any machine capable of executing a set of instructions (sequential or otherwise) that specify actions to be taken by that machine. Further, while only a single device is illustrated, the term "device" shall also be taken to include any collection of devices that individually or jointly execute a set (or multiple sets) of instructions to perform the methods discussed herein.

The example device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Device 700 may further include a network interface device 708 which may communicate with a network 720. The device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions for carrying out the operations described herein, in accordance with one or more aspects of the present disclosure. Instructions implementing instructions 726 for one or more of a communication component or a power component may also reside, completely or at least partially, within main memory 704 and/or within processing device 702 during execution thereof by device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

In some embodiments, the example device 700 may include a subset of the components illustrated in FIG. 7. For example, the example device 700 may include the processing device, the main memory 704 (or other type or data storage device, such as a persistent data storage device), and the network interface device 708.

Unless specifically stated otherwise, terms such as "determining," "transmitting," "receiving," "transitioning," "indicating," "analyzing," "causing," "providing," "comparing," "requesting," "preventing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An apparatus, comprising:
a wireless transceiver configured to communicate data with a network device; and
a processing device, operatively coupled with the wireless transceiver, the processing device to:
determine whether a computing device coupled to the apparatus has data to transmit to the network device, wherein the computing device comprises a source of the data and wherein the apparatus comprises a network interface for the computing device;
in response to determining that the computing device does not have data to transmit to the network device, transmit a first message indicating that the computing device does not have data to transmit to the network device; and transition the apparatus to a reduced power state, wherein the apparatus uses less power in the reduced power state than an active state without changing a power state of the computing device that provides the data to the apparatus for transmission through the wireless transceiver to the network device and that also provides an indication for the processing device to determine whether the computing device has data to transmit to the network device.

2. The apparatus of claim 1, wherein the first message comprises an 802.11 frame.

3. The apparatus of claim 1, wherein to transmit the first message indicating that the computing device does not have data to transmit to the network device, the processing device is further configured to:
set the value of a Power Management field of the 802.11 frame to indicate that the apparatus is transitioning to the reduced power state.

4. The apparatus of claim 1, wherein to determine whether the computing device has data to transmit to the network device, the processing device is further to:
determine whether a second message indicating the computing device does not have data to transmit, was received from the computing device.

5. The apparatus of claim 1, wherein to determine whether the computing device has data to transmit to the network device, the processing device is further to:
analyze a schedule, wherein the schedule indicates periods of time that the computing device will have data to transmit to the network device.

6. The apparatus of claim 5, wherein the processing device is further to:
receive the schedule from the computing device.

7. The apparatus of claim 1, wherein the processing device is further to:
transition from the reduced power state to the active state; and
transmit data to the network device for a period of time; and
transition from the active data to the reduced power state, wherein the period of time is less than an inactivity timeout.

8. The apparatus of claim 1, wherein the processing device is further to:
in response to determining that the computing device has data to transmit to the network device, cause the apparatus to remain in the active state.

9. The apparatus of claim 1, wherein the processing device is further to:
determine whether the network device has data to transmit to the computing device during a beacon period, wherein the apparatus remains in the reduced power state;
transition the apparatus to the active state in response to determining that the network device has data to transmit to the computing device; and
cause the apparatus to remain in the reduced power state in response to determining that the network device does not have data to transmit to the computing device.

10. An apparatus, comprising:
a memory configured to store data; and
a processing device, operatively coupled to the memory and coupled to a wireless network interface for the apparatus to transmit data sourced by the apparatus through the wireless network interface to a network device and for the apparatus to provide an indication to the wireless network interface whether the apparatus has data to transmit to the network device, the processing device to:
determine whether there is data to transmit to the network device; and
provide the indication to the wireless network interface coupled to the apparatus that there is no data to transmit to the network device, wherein the wireless network interface is configured to transition to a reduced power state based on the indication without changing a power state of the apparatus, and wherein the wireless network interface is configured to transmit a first message indicating that the apparatus does not have data to transmit to the network device.

11. The apparatus of claim 10, wherein to provide the indication the processing devices is further to:
transmit a message to the network interface indicating that there is no data to transmit to the network device.

12. The apparatus of claim 10, wherein to provide the indication the processing devices is further to:
include the indication in an existing message that was to be transmitted to the network device.

13. The apparatus of claim 10, wherein to provide the indication the processing devices is further to:
transmit a schedule to the network interface, wherein the schedule indicates periods of time that the apparatus will have data to transmit to the network device.

14. The apparatus of claim 10, wherein the indication is provided to the network interface in response to determining that there is no data to transmit.

15. A method, comprising:
determining whether a computing device coupled to an apparatus has data to transmit to a network device, wherein the computing device comprises a source of the data and wherein the apparatus comprises a network interface for the computing device;
in response to determining that the computing device does not have data to transmit to the network device, transmitting a first message indicating that the computing device does not have data to transmit to the network device; and
transitioning the apparatus to a reduced power state, wherein the apparatus uses less power in the reduced power state than an active state without changing a power state of the computing device that provides the data to the apparatus for transmission through the apparatus to the network device and that also provides an indication for the apparatus to determine whether the computing device has data to transmit to the network device.

16. The method of claim 15, wherein the first message comprises an 802.11 frame.

17. The method of claim 15, wherein transmitting the first message indicating that the computing device does not have data to transmit to the network device comprises:
setting the value of a Power Management field of the 802.11 frame to indicate that the apparatus is transitioning to the reduced power state.

18. The method of claim 15, wherein determining whether the computing device has data to transmit to the network device comprises:
determining whether a second message indicating the computing device does not have data to transmit, was received from the computing device.

19. The method of claim 15, wherein determining whether the computing device has data to transmit to the network device comprises:

analyzing a schedule, wherein the schedule indicates periods of time that the computing device will have data to transmit to the network device.

20. The method of claim 15, further comprising:

in response to determining that the computing device has data to transmit to the network device, causing the apparatus to remain in the active state.

\* \* \* \* \*